Sept. 23, 1941.  B. M. HYMAN  2,256,829

PICK-UP ATTACHMENT FOR HARVESTER-THRESHERS

Filed Aug. 9, 1939  3 Sheets-Sheet 1

Inventor
Benjamin M. Hyman
By Paul O. Pippel
Atty.

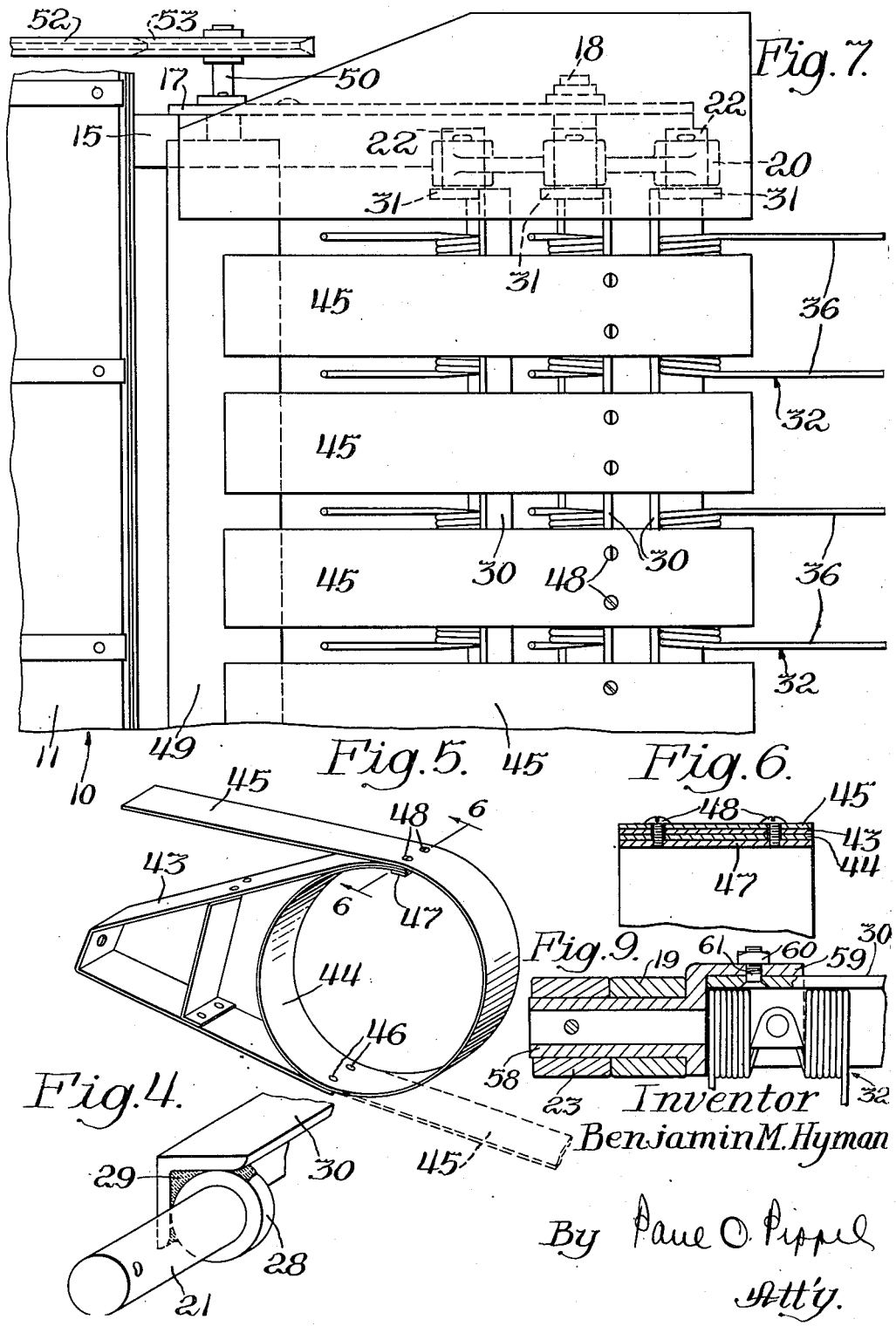

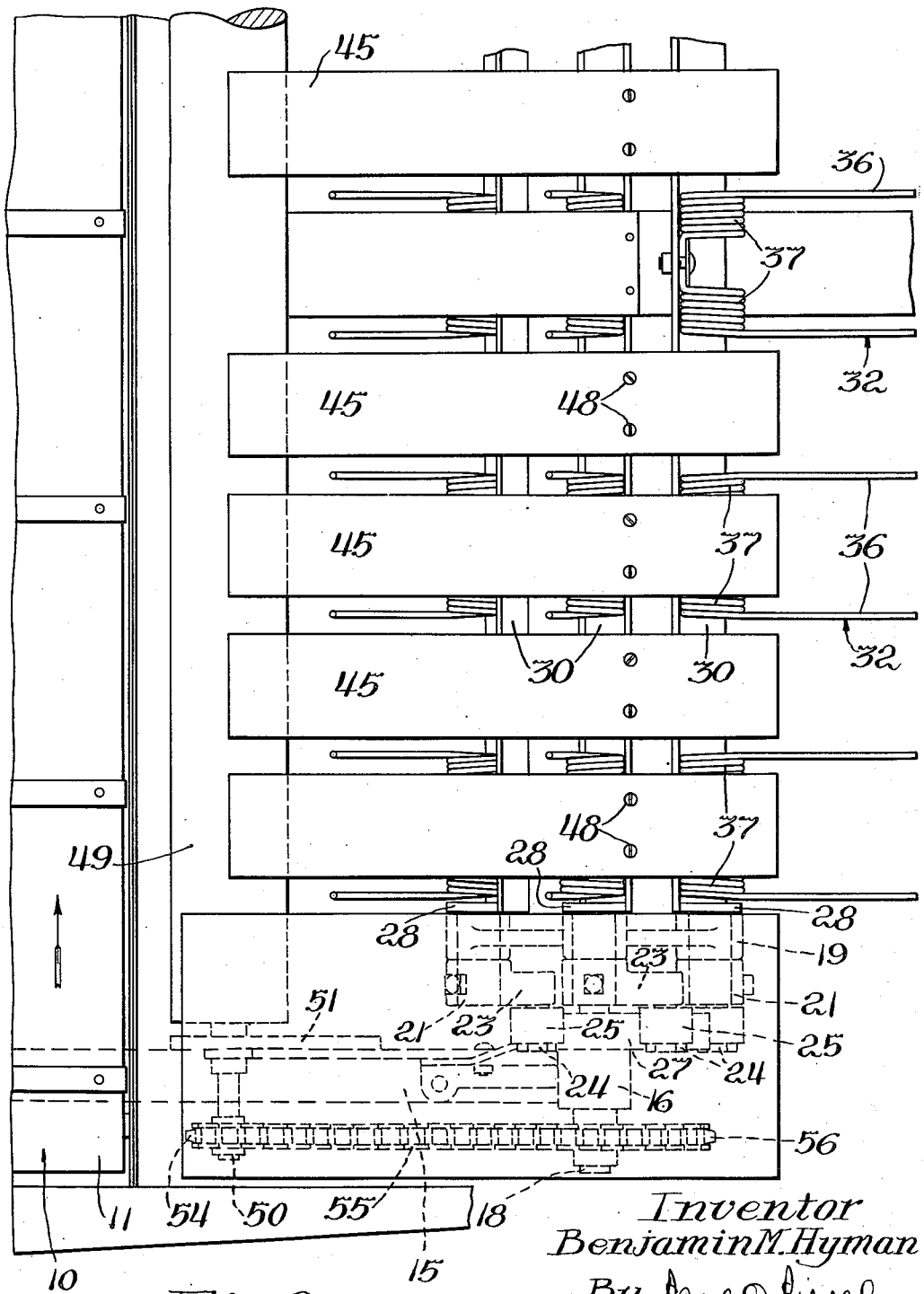

Patented Sept. 23, 1941

2,256,829

UNITED STATES PATENT OFFICE 2,256,829

PICK-UP ATTACHMENT FOR HARVESTER-THRESHERS

Benjamin M. Hyman, Moline, Ill., assignor to International Harvester Company, a corporation of New Jersey Application August 9, 1939, Serial No. 289,146

13 Claims. (Cl. 56—364)

This invention relates to an attachment for picking up cut grain. More particularly it relates to a novel way of mounting rake teeth upon a pick-up attachment.

In pick-up attachments of the type shown in the patent to Raney et al., No. 1,815,327, July 21, 1931, there are rake teeth mounted on shafts. The replacement of the teeth in event of breakage is a very difficult task for each rake tooth is secured to the shaft with the shaft extending through a coil of the tooth. Replacement of a single tooth requires the removal of the shaft so that the new tooth may be put in place with the shaft passing through the coil of the tooth. If the tooth to be replaced is not at the end of the shaft, all the teeth between the end of the shaft and the tooth to be replaced must be removed. Removal of the shaft because of breakage of the tooth or of the shaft itself requires removal of the carriers or supporting spiders. The present invention contemplates a change in construction of the shaft so that removal of the shaft is unnecessary for replacement of rake teeth, and even removal of the shaft may be effected without removal of the carriers supporting the shaft.

An object of the present invention is the provision of an improved pick-up attachment.

Another object is to provide an improved construction which makes unnecessary the removal of the shaft carrying the rake teeth in the event of breakage of rake teeth.

A further object is the provision of an improved construction which makes unnecessary the removal of shaft carriers for removal of broken rake teeth or removal of the shaft itself in the event of breakage.

A further object is the provision of a structure which facilitates access to the individual rake teeth of a pick-up attachment.

According to the present invention, there are provided rows of rake teeth extending the length of and spaced circumferentially about a pick-up attachment. Each rake tooth is mounted for oscillation about an axis passing through a coil of the tooth, not on shafts passing through the coil as in the construction disclosed on the aforementioned Raney et al. patent but on angle members extending the length of the pick-up attachment and connected at their ends to stub shafts. No part of the stub shafts or the angle members on which the rake teeth are mounted passes through the coils of the teeth, and consequently removal of the teeth may be effected without removal of the angle members or the stub shafts. Easy access to the rake teeth is had by construction of deck strips in such a way that, upon removal of securing members, the strips spring open and permit the rake teeth to be reached.

In the drawings,

Figure 4 is a perspective view showing the manner of attachment of stub shafts to angle members carrying rake teeth;

Figure 5 is a perspective view showing the mounting of a deck strip on a bracket;

Figure 6 is a sectional view taken along the line 6—6 of Figure 5;

Figure 7 is a plan view of the stubbleward end of the pick-up attachment;

Figure 8 is a plan view of the grainward end of the attachment; and,

Figure 9 is a detail view, partly in section, showing a modified form of attaching a rake tooth carrying bar to a stub shaft.

Figure 1:
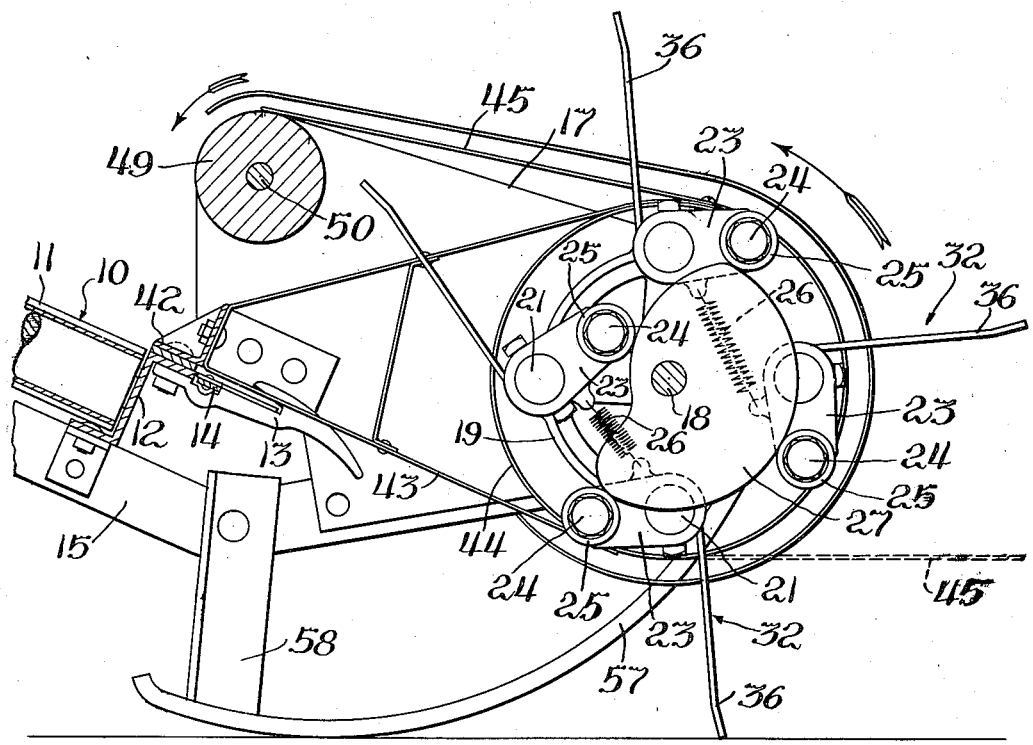
Figure 1 is an end view partly in section of the novel pick-up attachment.
Figure 2:
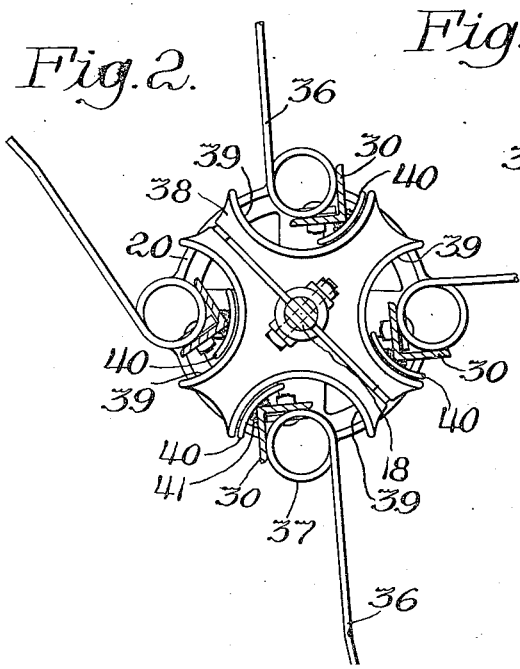
Figure 2 is a sectional view of the attachment.
Figure 3:
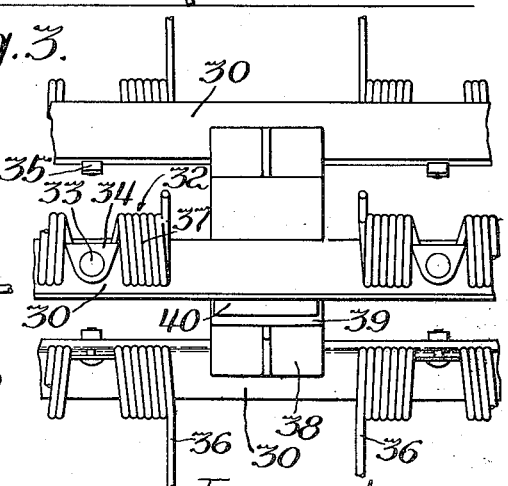
Figure 3 is a side elevation of the structure of Figure 2.

The pick-up attachment of the present invention is generally like that disclosed in the patent to Raney et al., No. 1,815,327, July 21, 1931. The attachment is secured at the point of connection of the cutter bar on the usual harvester thresher. It is adapted to gather cut grain and to deposit it on a platform conveyor which carries it to a thresher.

The numeral 10 designates a harvester thresher of which only a platform conveyor 11, Z-bar 12, guard fingers 13, and cutter bar 14 are shown. Frame members 15 are secured beneath and at both ends of the platform conveyor 11 and carry at the grainward end a bracket 16 and at the stubbleward end a bracket 17. The brackets 16 and 17 rotatably carry a shaft 18. Fixed adjacent the grainward end of the shaft 18 is a carrier 19 and at the stubbleward end, a carrier 20. A plurality of short rake tooth shafts 21 is rotatably mounted in the carrier 19 and a similar group of shafts 22 is mounted in the carrier 20. A crank 23 is secured to one end of each of the shafts 21 and carries a bolt 24 on which is rotatably mounted a roller 25. A spring 26 joins each adjacent pair of cranks 23 and maintains each roller 25 in contact with a cam 27 secured to the bracket 16.

The end of each shaft 21 opposite that which carries the crank 23 has an enlargement 28 which is welded as at 29 to the inside of one end of an angle member 30. A similar enlargement 31 on the end of each pin 22 is welded within the opposite end of each angle member 30. Each angle member has connected to it a plurality of rake teeth 32 by means of bolts 33, clips 34, and nuts 35 which secure a central section of the teeth to the angle bar. Each tooth 32 comprises a pair of tooth portions 36 and a pair of coils 37, which have their center approximately on the axis of the shafts 21 and 22.

A support 38 formed in halves is secured to a mid-point of the shaft 18 and has an arcuate reentrant portion 39 opposite each angle member 30. An arcuate member 40 of a curvature conforming to the portion 39 is secured by welding, as at 41, to the corner of each angle member 30 and rests within the portion 39. The support 38 with the aid of the arcuate members 40 serves to support the angle members 30 and prevent them from bending out of line.

An angle member 42 is secured to the top of the Z-member 12 and has secured to it at intervals between each rake tooth portion 36 a plurality of brackets 43 of A-shape carrying deck strips 44. Each deck strip is formed of a strip of metal bent to circular shape with an extension 45 beyond the circular portion, which is riveted at one side as at 46 to the end of one leg of the A-shaped bracket 43 and at the other side to the end of the other leg of the bracket 43 with the one end of the strip secured on one side of the extension 45 secured on the other side and a threaded plate 47 and cap screws 48 holding the parts together, as shown in Figure 6. As a consequence of this arrangement of parts, the deck strip springs to the dotted line position of Figure 5 when the plate 47 and cap screws 48 are removed. Thus easy access is had to the rake teeth for removal in case of breakage. The extension 45 of the deck strips 44 rests on a roller 49 fixed to a shaft 50 rotatably mounted in the bracket 17 at the stubbleward end and a bracket 51 at the grainward end and driven by a V-belt 52 and a pulley 53 secured to the stubbleward end of the shaft 50. A sprocket 54 is fixed to the grainward end of the shaft 50 and drives a sprocket chain 55, in turn driving a sprocket 56 secured to and driving the shaft 18 which drives the pick-up attachment.

As shown in Figure 1, the pick-up attachment is carried on a shoe 57 under each frame bar 15 and is connected to the frame bar by a member 58.

As shown in Figure 9, the angle 30 may be removably secured to a modified form of stub shaft 58. The shaft has a portion 59 which extends from the body of the shaft so as to be in contact with the outside of the two sides of the angle member. Bolts 60 and nuts 61 secure the portion 59 of the shaft to two sides of the angle iron, the nut and bolt being shown on only one side. With this arrangement of parts, the angle member 30 may be removed for the sake of replacement of rake teeth or of the angle member itself in the event of breakage without disturbance of the carrier 19 at either end of the angle member. Thus, if desired, the member itself may be removed and broken teeth replaced instead of the replacement of teeth while the angle member is in position secured to the stub shafts.

The operation of the pick-up attachment is as described in the aforementioned Raney et al. patent. The harvester-thresher is moved across a field containing cut grain preferably formed in windrows. By rotation of the shaft 18 and the carrier 19, the rake teeth are rotated in a counter-clockwise direction, as shown by the arrow in Figure 1, to pick up the windrow. As the rake teeth rotate, their angularity is changed by the cam 27 contacting the rollers 26. The picked-up grain falls on the deck strip extensions 44 from which it is stripped by the roller 49 and falls on the conveyor 11, which transports it to the thresher.

One important feature of the present invention is the provision of the angle members 30 to which the rake teeth 32 are attached. These angle members permit the attachment of the rake teeth in a position such that their axis of rotation for change of angularity passes through the coils of the teeth, and yet there is no part to which the teeth are secured, passing through the teeth. Thus an easy removal of the teeth from their carrying members is made possible. Actually, any member which affords the same circumferentially spaced support for the coils of the rake teeth might be employed in place of the angle member. In practice, the angle member has been found desirable because of its cheapness of manufacture.

Another feature is the removable attachment of the angle members to the stub shafts so that the angle members may be removed without disturbing the carriers in which the stub shafts are mounted.

The intention is to limit the invention only within the scope of the appended claims.

What is claimed is:

1. In combination, a carrier, a shaft rotatably mounted in the carrier, a rake tooth having a coil, and a member secured to the shaft and to the rake tooth and partially surrounding the coil of the tooth so as to give the coil support at two circumferentially spaced points and to hold the axis of the coil in approximate coincidence with the axis of the shaft.

2. In combination, a shaft, carriers secured adjacent the ends thereof, stub shafts rotatably mounted in the carriers, a member secured to the stub shafts, and a rake tooth secured to the member and having a coil, the center-line of the stub shafts passing through the coil, and the member being entirely exterior of the coil.

3. In combination, a shaft, carriers secured adjacent the ends thereof, a support secured at a mid-point of the shaft having an arcuate reentrant portion, stub shafts rotatably mounted in the carriers, means secured to the stub shafts and having an arcuate exterior for a portion of its length substantially in contact with the reentrant portion of the support, and a rake tooth secured to the means and having a coil, the center-line of the stub shafts passing through the coil, and the means being entirely exterior of the coil.

4. In combination, a shaft, carriers secured adjacent the ends thereof, a support secured at a mid-point of the shaft and having an arcuate reentrant portion, stub shafts rotatably mounted in the carriers, a rake tooth having a coil, and a member having an arcuate exterior at a portion extending through the reentrant portion of the support, secured to the stub shafts and to the rake tooth, and partially surrounding the coil of the tooth so as to support the coil at a plurality of circumferentially spaced points and to maintain the axis of the coil in approximate coincidence with the axis of the stub shafts.

5. In combination, a shaft, carriers secured adjacent the ends thereof, a support secured at a mid-point of the shaft and having an arcuate reentrant portion, stub shafts rotatably mounted in the carriers, an angle member secured at the inside of its legs to the stub shafts, a rake tooth secured to the inside of one leg and having a coil positioned on the inside of both legs, and an arcuate member secured to the outside of and at the corner of a mid-point of the angle member and positioned in the reentrant portion of the support.

6. In combination, a pair of carriers secured in spaced relation with respect to one another, stub shafts rotatably mounted in the carriers, a member detachably secured to the stub shafts, a rake tooth secured to the member and having a coil partially surrounded by the member so as to be supported at a plurality of circumferentially spaced points with its axis approximately coincident with the axis of the stub shafts.

7. In combination, a support, a shaft rotatably mounted thereon, carriers fixed to the shaft adjacent its ends, a cam fixed to the support adjacent an end of the shaft, a stub shaft rotatably mounted in one carrier and having a crank arm with a follower mounted thereon contacting the cam, a stub shaft mounted in the other carrier, means secured to the stub shafts, and a rake tooth secured to the means and having a coil, the center-line of the stub shafts passing through the coil, and the means being entirely exterior to the coil.

8. A pick-up attachment comprising a support, a carrying means rotatably mounted thereon, rake teeth secured to the carrying means, a plurality of strips surrounding the carrying means and rake teeth, each strip having a portion of its length bent into circular shape and secured to the support and the remainder of its length extending straight beyond the circular portion, the end and the mid-point of the strip at the end of the circular portion being detachably secured to one another for permitting access to the rake teeth.

9. A pick-up attachment comprising a support, a carrying means rotatably mounted thereon, rake teeth having coils secured to the carrying means with no portion thereof passing through the coils, and a plurality of strips surrounding the carrying means and the rake teeth, each strip having a portion of its length bent into circular shape and secured to the support and the remainder of its length extending straight beyond the circular portion, the end and the mid-point of the strip at the end of the circular portion being detachably secured to one another for permitting the straight portion to spring away from the circular portion to permit removal of individual rake teeth.

10. A pick-up attachment comprising a support, a shaft rotatably mounted thereon, carriers secured adjacent the ends of the shaft, stub shafts rotatably mounted on the shafts, an angle member welded at the inside of its legs to the stub shafts, a plurality of rake teeth, each being secured to the inside of one leg of the angle member and having a coil through which the axis of the stub shafts pass, and a plurality of strips surrounding the teeth and the shaft, each strip having a portion of its length bent into circular shape and the remainder of its length extending straight beyond the circular portion, and means detachably securing the end and the mid-point of the strip at the end of the circular portion for permitting the straight portion to spring away from the circular portion upon detachment so as to provide easy access to the teeth for the removal thereof individually.

11. A pick-up attachment comprising a support, carrying means journaled thereon and including an angle member, rake teeth secured to the inside of one leg of the angle member and having coils within the angle member, a plurality of strips surrounding the carrying means and rake teeth, each strip having a portion of its length bent into circular shape and the remainder thereof extending straight, and screw threaded means detachably securing the ends of the circular portion of the strip for causing upon detachment the straight portion of the strip to spring away from the circular portion so as to provide access for easy removal of individual rake teeth.

12. A pick-up attachment comprising a support, carrying means journaled thereon and including an angle member, rake teeth secured to the inside of one leg of the angle member and having coils within the angle member, a plurality of strips surrounding the carrying means and rake teeth, each strip having a portion of its length bent into circular shape and the remainder thereof extending straight, and means detachably securing the ends of the circular portion of each strip for causing upon detachment the straight portion of the strip to spring away from the circular portion so as to provide access for easy removal of individual rake teeth, said means comprising for each strip a pair of cap screws extending through openings in the secured parts of the strip and a plate threaded to the screws.

13. In combination, a carrier, a shaft rotatably mounted on the carrier, a rake tooth having a coil, and an angle member secured to the shaft and supporting on its inner sides the coil of the tooth at two circumferentially spaced points, and means securing the tooth to the angle member.

BENJAMIN M. HYMAN.